(12) United States Patent
Wiley (10) Patent No.: US 9,622,467 B2
(45) Date of Patent: Apr. 18, 2017

(54) WILD GAME CALL

(71) Applicant: Wildgame Innovations, LLC, Baton Rouge, LA (US)

(72) Inventor: William Thomas Wiley, Starkville, MS (US)

(73) Assignee: Wildgame Innovations, LLC, Baton Rouge, LA (US)

( * ) Notice: Subject to any disclaimer, the term of this patent is extended or adjusted under 35 U.S.C. 154(b) by 0 days.

(21) Appl. No.: 13/711,816

(22) Filed: Dec. 12, 2012

(65) Prior Publication Data

US 2013/0309934 A1 Nov. 21, 2013

Related U.S. Application Data

(60) Provisional application No. 61/647,757, filed on May 16, 2012.

(51) Int. Cl.
*A63H 5/00* (2006.01)
*A01M 31/00* (2006.01)

(52) U.S. Cl.
CPC .................. *A01M 31/004* (2013.01)

(58) Field of Classification Search
CPC ......... A01M 31/004; A63H 5/00; G10D 7/10; G10D 9/043; G10G 5/00
USPC ................................. 446/207–209
See application file for complete search history.

(56) References Cited

U.S. PATENT DOCUMENTS

| | | | |
|---|---|---|---|
| 387,338 A * | 8/1888 | Canney | 446/192 |
| 2,969,611 A | 1/1961 | Warren, Jr. | |
| 3,798,383 A * | 3/1974 | Brandstatter | 379/373.01 |
| 3,811,221 A | 5/1974 | Wilt | |
| 3,815,283 A | 6/1974 | Piper | |
| 3,955,313 A | 5/1976 | Faulk | |
| 3,968,592 A | 7/1976 | Piper | |
| 3,991,513 A * | 11/1976 | Faulk | 446/208 |
| 4,048,750 A | 9/1977 | Wolfe | |
| 4,211,031 A * | 7/1980 | Gambino | 446/208 |
| 4,576,584 A | 3/1986 | Hill | |
| 4,799,913 A | 1/1989 | Wolfe | |
| 4,950,198 A | 8/1990 | Repko, Jr. | |
| 5,549,498 A | 8/1996 | Kirby | |
| 5,735,725 A | 4/1998 | Primos | |
| 5,803,785 A | 9/1998 | Primos, Jr. et al. | |
| 6,062,940 A | 5/2000 | Bean | |
| 6,095,884 A * | 8/2000 | Wiley | 446/208 |

(Continued)

OTHER PUBLICATIONS

PCT International Searching Authority/ US, International Search Report mailed Sep. 13, 2013, for PCT/US2013/040353, "Wild Game Call."

(Continued)

*Primary Examiner* — Aarti B Berdichevsky
*Assistant Examiner* — Urszula M Cegielnik
(74) *Attorney, Agent, or Firm* — Jones Walker LLP (57) ABSTRACT

An apparatus for calling wild game. The apparatus may be used for calling wild turkeys. In one embodiment, the apparatus comprises a barrel that receives an air flow and a bell which is the part where sound is emitted. The apparatus also includes a sound chamber made-up of two parts that are fixed together to create one sound chamber, where the sound chamber is inserted into the bell. The call also includes latex reeds, wherein the latex reeds cover the openings in the sound chamber.

11 Claims, 6 Drawing Sheets

(56) References Cited

U.S. PATENT DOCUMENTS

| | | | |
|---|---|---|---|
| 6,179,684 B1 | 1/2001 | Carlton | |
| 6,254,451 B1 | 7/2001 | Bean | |
| 6,471,563 B1 | 10/2002 | Carlton | |
| 6,575,804 B1 | 6/2003 | Primos | |
| 6,612,894 B2 | 9/2003 | Carlton | |
| 6,878,867 B2* | 4/2005 | Porath | 84/402 |
| 7,011,564 B2* | 3/2006 | Ady et al. | 446/207 |
| 7,553,210 B1 | 6/2009 | Keller, Jr. et al. | |
| 7,642,438 B1 | 1/2010 | Cohen | |
| 7,658,660 B1* | 2/2010 | Drury | 446/207 |
| 7,963,819 B2 | 6/2011 | Keller, Jr. et al. | |
| 8,025,548 B2 | 9/2011 | Keller, Jr. et al. | |
| 8,622,782 B2* | 1/2014 | Fulcher | 446/207 |
| 2005/0142982 A1* | 6/2005 | Sceery | 446/207 |
| 2008/0009222 A1 | 1/2008 | Lombardi | |
| 2010/0240275 A1* | 9/2010 | Rowley et al. | 446/208 |

OTHER PUBLICATIONS

PCT International Searching Authority/ US, Written Opinion of the International Searching Authority, mailed Sep. 13, 2013, for PCT/US2013/040353, "Wild Game Call."

* cited by examiner

WILD GAME CALL

This application claims priority of Provisional Application No. 61/647,757, filed 16 May 2012, and entitled "Wild Game Call."

BACKGROUND OF THE INVENTION

This invention relates to a game call. More particularly, but not by way of limitation, this invention relates to a wild game call. In the preferred embodiment, the call is used for wild turkeys.

In an effort to call wild game, various devices have been proposed. Prior art designs attempt to produce natural animal sounds. The sounds emitted from these designs may attract a variety of wild game, such as turkeys, to the caller.

SUMMARY OF THE INVENTION

In one embodiment, an apparatus for calling wild game by a user is disclosed. The apparatus comprises a barrel that is blown into by the user and a bell which is the part where sound is emitted. The apparatus also includes a sound chamber made-up of two parts that are fixed together to create one sound chamber, where the sound chamber is inserted into the bell. The call also includes latex reeds, wherein the latex reeds cover the opening in the sound chamber.

In another embodiment, an apparatus for calling wild game by a user includes a barrel having a mouthpiece and an outlet, a bell configured to engage the outlet, with the bell containing a cavity, and a sound chamber configured to be received within the cavity, the sound chamber having a first cylindrical portion having a sound inlet and a second cylindrical portion having a sound outlet. The apparatus also includes a first reed operatively associated with the sound outlet and second reed operatively associated with the sound inlet. In one embodiment, the reeds are constructed of a flexible material, which may be a latex material. The sound outlet and the sound inlet may be axially offset so that a skewed sound path is formed. In one embodiment, the reed in the outlet occupies less than half the area of the outlet and the reed in the inlet occupies less than half the area of the inlet. In another embodiment, the barrel and the bell comprise a flexible material, such as an elastomeric material, so that pressure can be applied by the hands of the user to the barrel and bell thereby changing the cross-sectional area which varies the sound emitted. The sound emitted emulates that of a wild turkey in one embodiment.

In another embodiment, an apparatus for calling wild game is disclosed. In this embodiment, the apparatus includes a barrel having a mouthpiece and an outlet, a bell operatively attached to the outlet, with the bell containing a cavity therein and an exit, wherein the exit is a dome structure having an opening in a wall portion of the dome structure, and a sound chamber configured to be received within the cavity, the sound chamber having a first cylindrical portion having a sound inlet and a second cylindrical portion having a sound outlet. The apparatus may further include a first reed operatively associated with the sound inlet of the sound chamber and a second reed operatively associated with the sound outlet of the sound chamber. In one disclosed embodiment, the dome structure may contain a plurality of openings in the wall portion.

In yet another embodiment, an apparatus for calling wild game by emitting a sound is disclosed. The apparatus includes a barrel that receives an air flow in a barrel inlet, a bell configured to allow the sound to be emitted, a sound chamber inserted into the bell, the sound chamber having an inlet and an outlet, a first reed covering a portion of the inlet of the sound chamber, a second reed covering a portion of the outlet of the sound chamber, wherein the first and second reed are constructed of a flexible material. The apparatus may also include a bellows device, operatively attached to the barrel inlet, for creating the airflow directed into the barrel inlet so that the sound may be emitted from an outlet of the bell when the user shakes the bellows device. In one embodiment, the bellows device comprises a cylindrical body having a plurality of undulation members formed thereon, with the body having a first open end configured to engage the barrel inlet and a second closed end having a weight therein, and wherein the undulation members are configured to create the air flow through the sound chamber and out the outlet of the bell when the user shakes the bellows so that a sound is emitted.

DETAILED DESCRIPTION OF THE PREFERRED EMBODIMENTS

Figure 1A:
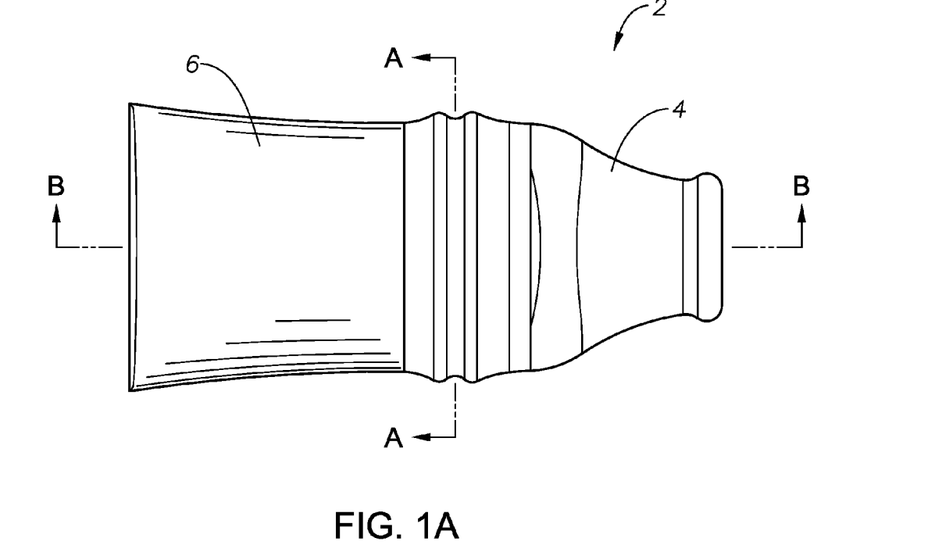
FIG. 1A is a side view of the call.

Referring now to FIG. 1A, a side view of the call 2 will now be described. The call 2 includes the barrel 4 that is adapted to be connected to the bell 6. As seen in FIG. 1A, the sound chamber 34 (not seen in this view) is inserted into the bell 6. In one embodiment, the barrel 4 and the bell 6 comprise a flexible material, such as an elastomeric material. The elastomeric material used in the preferred embodiment is polyvinyl chloride (PVC) with a durometer of 70. It should be noted that hard plastics or wood could also be used, but without the ability to squeeze and bend as to change the volume and tone.

Figure 1B:
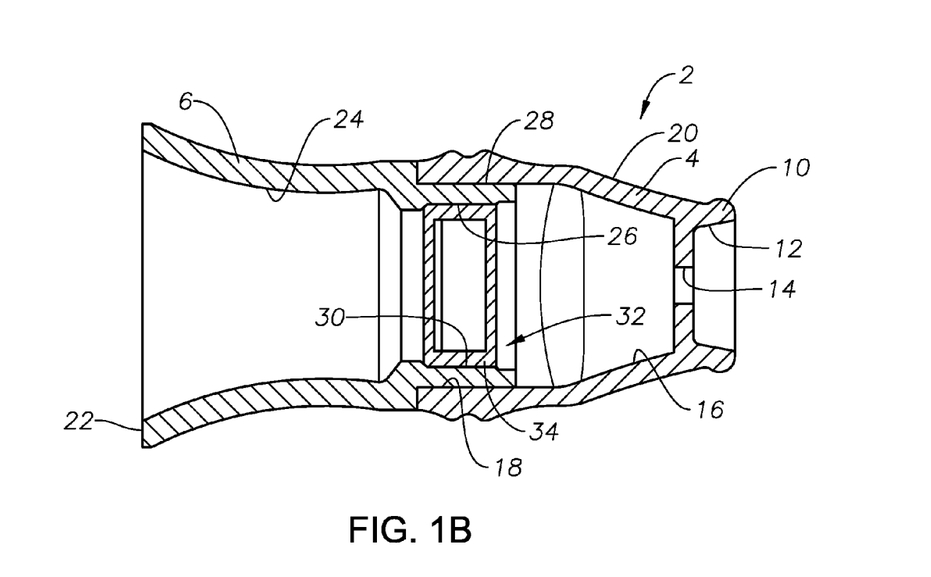
FIG. 1B is a cross-sectional view taken from line B-B of FIG. 1A.

Referring now to FIG. 1B, a cross-sectional view taken from line B-B of FIG. 1A will now be described. It should be noted that like numbers refer to like components in the various drawings. The barrel 4 has a mouthpiece section 10 (also referred to as barrel inlet 10), wherein the mouthpiece section 10 has a first larger opening 12 that extends to a smaller opening 14. The smaller opening 14 is optional and does create additional pressure on the latex reed due to the smaller diameter. The inner portion 16 of the mouthpiece section 10 is generally conical and generally extends to the radial section 18. As seen in FIG. 1B, the outer portion 20 is also generally conical in shape.

The bell 6 has an output portion 22 that extends to an internal section 24 that has a generally decreasing diameter. The inlet portion 26 is configured to cooperate with the radial section 18 of the mouthpiece section 10. Hence, the inlet portion 26 has an outer diameter surface 28 that engages the radial section 18. The inlet portion 26 has an inner diameter surface 30, wherein the inner diameter surface 30 forms a cavity area, seen generally at 32. The cavity area 32 is configured to receive the sound chamber 34. In one embodiment, the sound chamber 34 comprises a first cylindrical portion and a second cylindrical portion as will be more fully discussed later in this application.

Figure 1C:
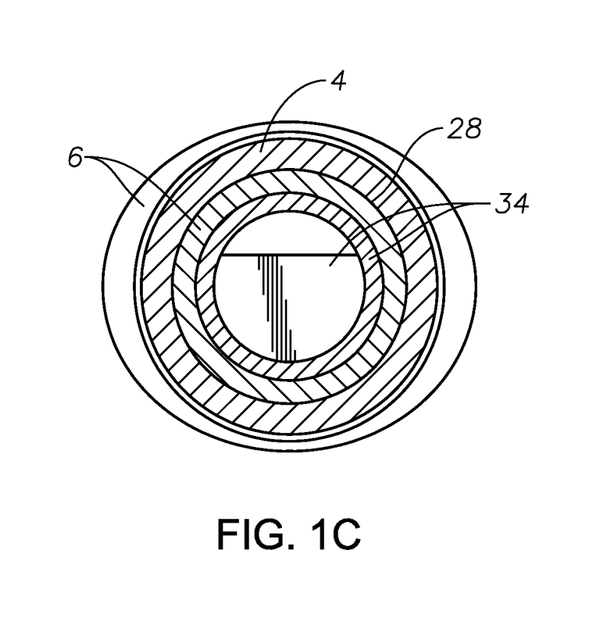
FIG. 1C is a cross-sectional view taken from line A-A of FIG. 1A.

Referring now to FIG. 1C, a cross-sectional view taken from line A-A of FIG. 1A will now be discussed. Hence, in this view, the sound chamber 34 portion along with the surface 28 of the bell 6, as well as the barrel 4 is depicted. An outer surface portion of the bell 6 is also depicted.

Figure 2:
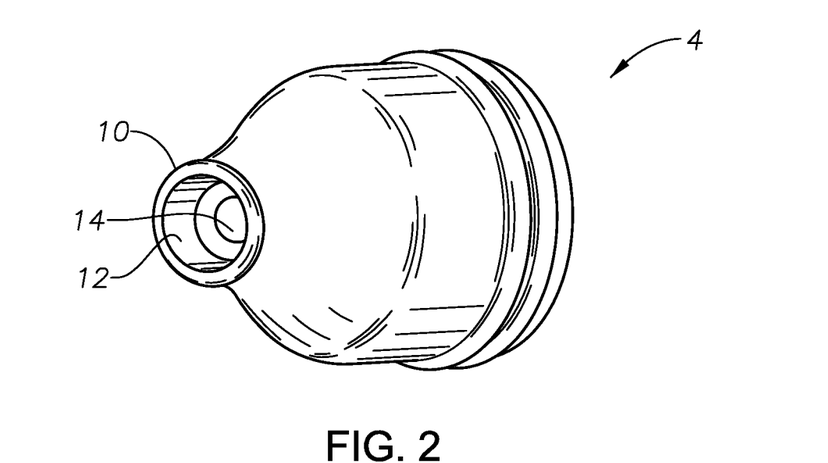
FIG. 2 is a perspective view of the barrel.
Figure 3:
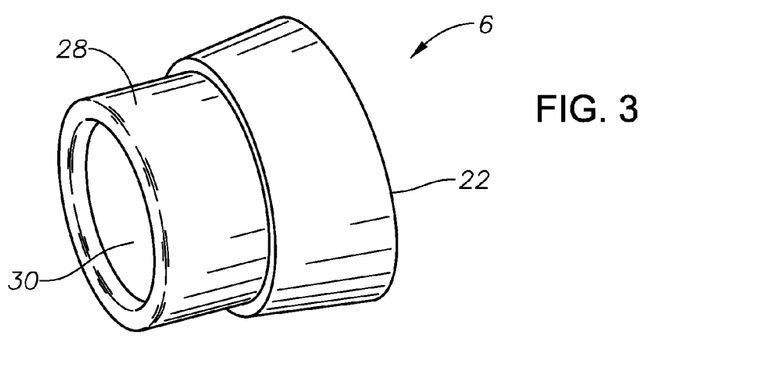
FIG. 3 is a perspective view of the bell.

FIG. 2 is a perspective view of the barrel 4. As depicted, the barrel 4 includes the mouthpiece section 10 along with the first opening 12 that extends to the inset second smaller opening 14. Referring now to FIG. 3, a perspective view of the bell 6 will now be described. In the view of FIG. 3, the output sound portion 22 is shown which extends to the outer diameter surface 28, wherein the outer diameter surface 28 extends to the inner diameter surface 30.

Figure 4:
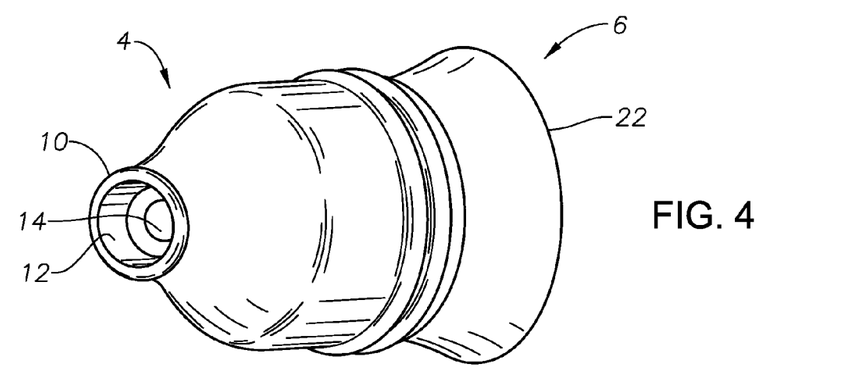
FIG. 4 is a perspective view of the barrel attached to the bell.

Referring now to FIG. 4, a perspective view of the barrel 4 attached to the bell 6 is shown. As illustrated, the output sound portion 22 of the bell is shown, along with the mouthpiece section 10 and first opening 12 and the inset second smaller opening 14. In one embodiment, the user blows onto the mouthpiece section 10 and a sound emulating a wild game is emitted from the output sound portion 22.

Figure 5:
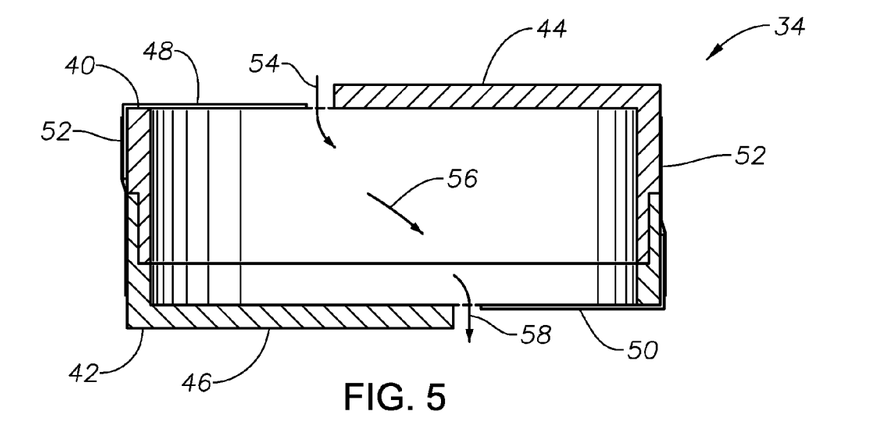
FIG. 5 is a sectional view of the sound chamber.

FIG. 5 is a sectional view of the sound chamber 34. The sound chamber 34 includes a first cylindrical part 40 and a second cylindrical part 42, wherein the first part 40 and second part 42 are connected together such as by snapping the two halves together. The first cylindrical part 40 has a partial disc 44 covering the opening and the second cylindrical part has a partial disc 46 covering the opening as shown in FIG. 5. A latex reed 48 covers the remaining open area relative to the disc 44 and the latex reed 50 covers the remaining open area relative to disc 46, such as seen in FIG. 5. Also, a tape 52 can be applied about the periphery of the sound chamber 34 for holding the latex reeds 48, 50 in place. The tape 52 may be a double sided tape. Hence, the latex reeds 48, 50 are skewed relative to each other. For instance, as noted by the sound path arrows 54 (entering), 56 (within the inner portion), and 58 (exiting), the sound path traveling the sound chamber 34 in this skewed pattern in conjunction with the vibration of the latex reeds generate sound. The latex reeds are commercially available from Pioneer Game Calls (www.pioneerturkeycalls.com) under the trade name Latex Reeds. It should be noted that in another embodiment, the latex reeds are not axially offset but could be in-line with each other to create a different sound. Also, FIG. 5 shows that the reeds in the outlet and the inlet occupies less than half the area of the outlet, but in another embodiment the reeds could occupy a greater area to achieve a different tone.

Figure 6:
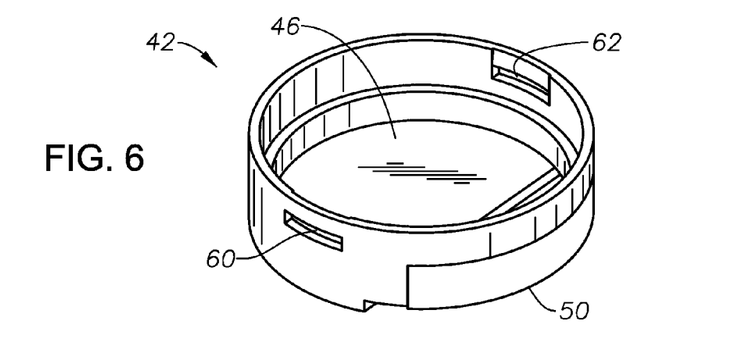
FIG. 6 is a perspective view of one of the sound chamber components.

FIG. 6 is a perspective view of the sound chamber second cylindrical part 42 of the sound chamber 34. Hence, the partial disc 46 covering a part of the opening is depicted along with the latex reed 50 is shown cooperating with the partial disc 46. Openings 60, 62 are shown which will cooperate with a receptacle tab for snapping the cylindrical part 42 with the cylindrical part 40 (cylindrical part 40 not shown in this view).

Figure 7:
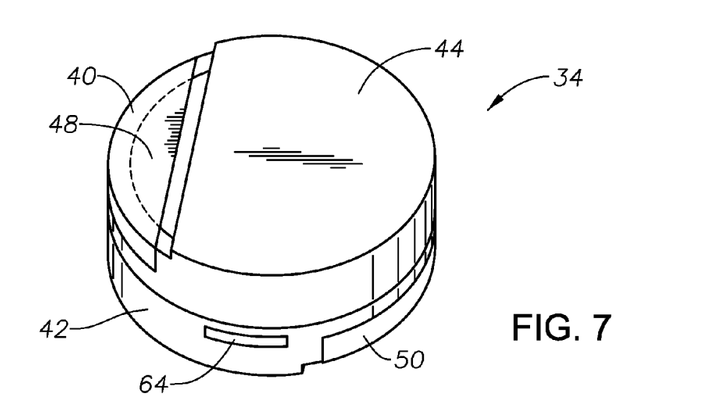
FIG. 7 is a perspective view of one of the two components of the sound chamber coupled together.

Referring now to FIG. 7, a perspective view of one of the two components (namely cylindrical part 40 and cylindrical part 42) of the sound chamber 34 coupled (i.e. snapped) together is illustrated. This view also depicts the partial disc 44 and the latex reed 48. A tab 64 is used to snap the cylindrical part 40 and the cylindrical part 42 together as shown.

Figure 8:
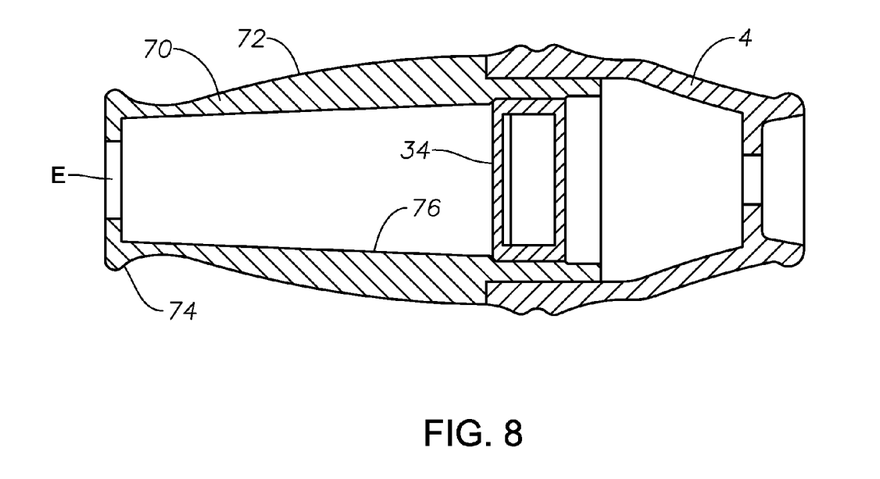
FIG. 8 is a cross-sectional view of a second embodiment of the call.

FIG. 8 is a perspective view of a second embodiment of the call. In the embodiment of FIG. 8, the barrel 4 and the sound chamber 34 are essentially the same as the first embodiment already described and the description will not be repeated. The bell is seen generally at 70 and has an outer diameter surface 72 that basically decreases in size in the direction of the flared exit output 74. Extending internally, the inner bore 76 is of generally constant inner diameter size, with the inner bore 76 configured to engage the sound chamber 34 as previously described. At the sound output end, the exit E is shown, wherein the exit E is smaller in diameter size than the diameter of the inner bore 76.

Figure 9A:
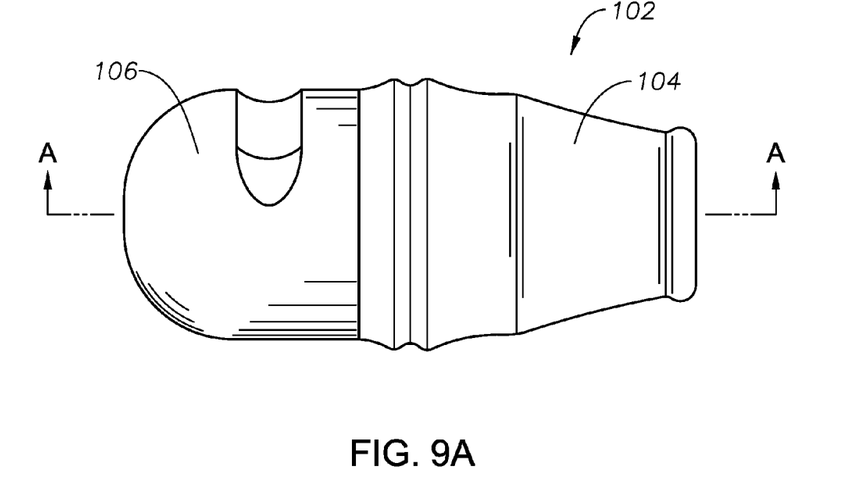
FIG. 9A is a side view of a third embodiment of the call.

Referring now to FIG. 9A, a side view of the third embodiment of the call will now be described. The call 102 seen in FIG. 9A includes the barrel 104 that is adapted to be connected to the bell 106. As seen in FIG. 9A, the sound chamber 108 is inserted into the bell 106.

Figure 9B:
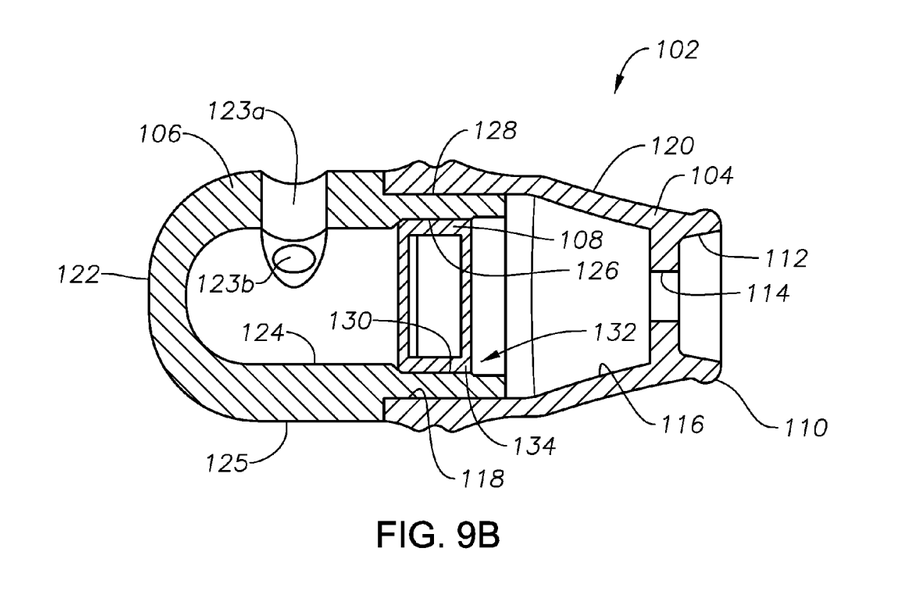
FIG. 9B is a cross-sectional view of the embodiment of FIG. 9A taken along line A-A.

Referring now to FIG. 9B, a cross-sectional view taken from line A-A of FIG. 9A will now be described. The barrel 104 has a mouthpiece section 110, wherein the mouthpiece section 110 has a first larger opening 112 that extends to a smaller opening 114. The inner portion 116 of the mouthpiece section 110 is generally conical and generally extends to the radial section 118. As seen in FIG. 9B, the outer portion 120 is also generally conical in shape.

The bell 106 has a distal end 122 that comprises a dome structure, wherein the dome distal end 122 contains opening 123a and opening 123b. The bell 106 has an internal section 124 with a wall portion 125 and the openings 123a, 123b are contained through the wall portion 125. The inlet portion 126 is configured to cooperate with the radial section 118 of the mouthpiece section 110. Hence, the inlet portion 126 has an outer diameter surface 128 that engages the radial section 118. The inlet portion 126 has an inner diameter surface 130, wherein the inner diameter surface 130 forms a cavity area, seen generally at 132. The cavity area 132 is configured to receive the sound chamber 134. In one embodiment, the sound chamber 134 comprises a first cylindrical portion and a second cylindrical portion as previously discussed.

The sound is emitted from the openings 123a, 123b. It should be noted that other openings that may exist within the wall portion of the dome structure. In one embodiment, a total of three openings are provided about the wall portion 125 of the dome 122, and wherein opening 123a is larger in area than the other openings. The plurality of openings allows the user to change tone and volume by covering and uncovering the holes, either in multiples or single. As noted in the previous discussion of FIGS. 1-8, in one preferred embodiment, the sound through the sound chamber is a skewed sound path 134 due to the sound's inlet and outlet being axially offset. Ultimately, the wild game sound exits the call 102 through openings 123a, 123b.

Figure 10:
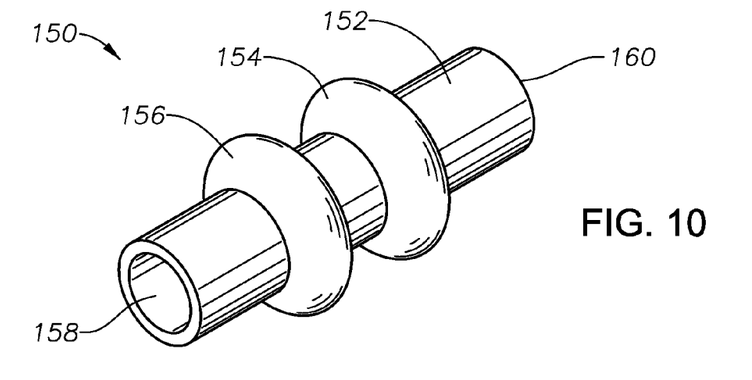
FIG. 10 is a perspective view of the bellows device.

Referring now to FIG. 10, a perspective view of the bellows device 150 will now be described. With this embodiment, the bellows device 150 may be used with the call 2. The bellows device 150 is generally a cylindrical body 152, with the body 152 having undulations, and more specifically, undulation member 154 and undulation member 156. The body 150 has a first opened end 158 and a second closed end 160. The opened end 158 will engage and cooperate with the call 2 and the closed end 160 will contain a weight, as will be more fully described below. The bellows device 150 is shaken by the user to create an air flow.

Figure 11:
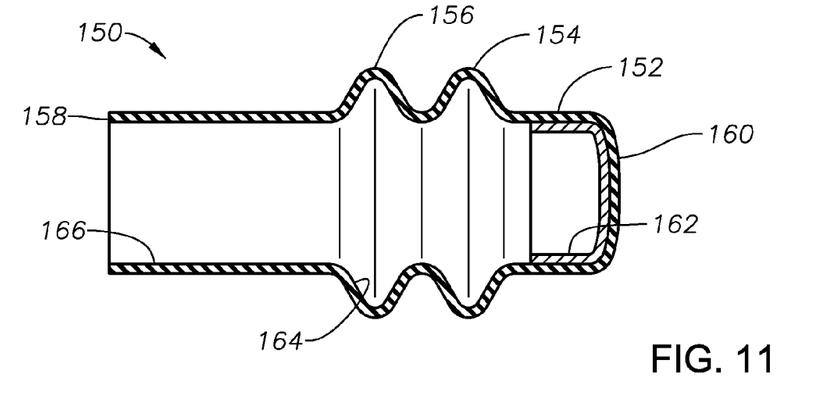
FIG. 11 is a cross-sectional view of the bellows device seen in FIG. 10.

FIG. 11 is a cross-sectional view of the bellows device 150 seen in FIG. 10. In this view, the weight 162 is shown (sometimes referred to as the plug 162). The inner surface portion 164 has a complimentary contour relative to the undulations 154, 156, with the inner surface portion 164 leading to the inner surface portion outlet 166. The inner shape of the bellows device 150 and the weight 162 allows for the user to shake the bellows device 150 thereby creating an air flow that will exit the open end 158.

Figure 12:
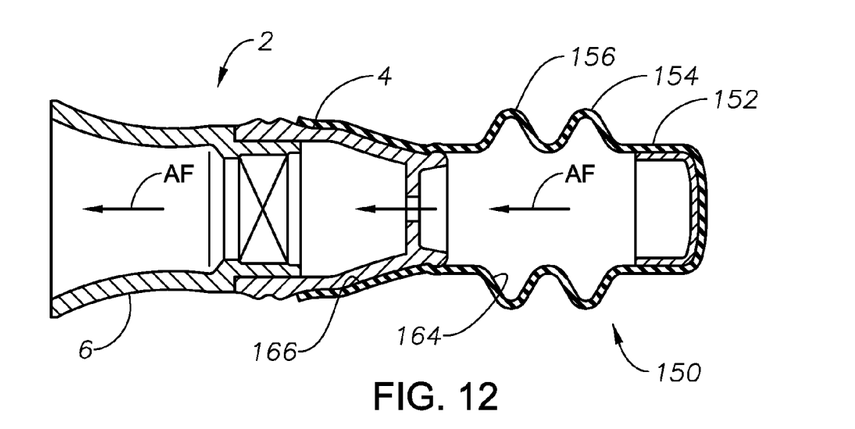
FIG. 12 is a cross-sectional view of the bellows device of FIG. 10 operatively attached to the call of FIG. 1A.

Referring now to FIG. 12, a cross-sectional view of the bellows device 150 of FIG. 10 operatively attached to the call 2. As noted earlier, the bellows device 150 will be constructed of a flexible material, such as an elastomer. The flexibility of the bellows device 150 can be characterized as an elastomeric material with a durometer less than 60. In one embodiment, the bellows device 150 is silicone rubber, which is very flexible, and capable of bending easily and returning to its original shape. The inner surface portion outlet 166 will cooperate and engage with the outer portion of the barrel 4 as seen in FIG. 12. Hence, the inner portion 166 sealingly engages the outer portion of the barrel 4. In this way, the air flow "AF" will be created in the inner portion of the bellows device 150 by the shaking and the air flow will be channeled through the call 2, and ultimately the sound exits the bell 6. According to the teaching of this disclosure, the bellows device 150 may be removed in order to use the call 2 as previously discussed.

An aspect of the disclosed call is that it does not require the user to manipulate the latex reed with the user's lips. The user only has to create an air flow. During operation, generated air flow is channeled into the bell, it travels through the sound chamber causing the latex reeds to vibrate and then sound is produced and exits the call from the bell. The sound that exits at the bell is the sound that emulates the wild game call.

Another aspect of the present disclosed call is that an accurate sounding call is produced and the user can control the cadence of the sounds with created air flow through the call. Air flow is created by the user blowing into the call or with the bellows device.

It will be apparent to one skilled in the art that modifications may be made to the illustrated embodiments without departing from the spirit and scope of the invention. Insofar as the description above and the accompanying drawing disclose any additional subject matter that is not within the scope of the claims below, the inventions are not dedicated to the public and right to file one or more applications to claim such additional inventions is reserved.

I claim:

1. An apparatus for calling wild game by a user comprising:

a barrel including a mouthpiece section with at least one opening to accommodate a mouth of the user for blowing air into a barrel cavity within the mouthpiece section, the barrel cavity including an inner portion and a radial section;

a bell operatively associated with the barrel, the bell including an output portion that extends to an internal section, the bell further including a bell inlet portion that fits within the radial section of the barrel cavity, wherein an outer diameter surface of the bell inlet portion engages with the radial section of the barrel cavity and an inner diameter surface of the bell inlet portion forms a bell cavity area within the radial section of the barrel cavity;

a sound chamber completely contained within the bell cavity area in the radial section of the barrel cavity, the sound chamber including a first cylindrical part and a second cylindrical part fixed together to form an inner portion, the first cylindrical part including a partial disc and a reed forming an inlet, the second cylindrical part including a partial disc and a reed forming an outlet, the sound chamber including a sound path from the inlet through the inner portion to the outlet and into the internal section of the bell, wherein a sound is emitted from the output portion of the bell directly into the atmosphere.

2. The apparatus of claim 1 wherein each reed is constructed of a flexible material.

3. The apparatus of claim 2 wherein the flexible material is a latex material.

4. The apparatus of claim 3 wherein the outlet and the inlet are axially offset so that the sound path is skewed.

5. The apparatus of claim 1 wherein the first and second cylindrical parts are snap fixed together.

6. The apparatus of claim 5 wherein a tape is applied about a periphery of the sound chamber to hold the reeds in place.

7. The apparatus of claim 4 wherein the barrel and the bell are each constructed of an elastomeric material.

8. The apparatus of claim 5 wherein the first cylindrical part further includes one or more tabs and the second cylindrical part further includes one or more openings, each opening receiving one of the tabs to snap fix the first and second cylindrical parts together.

9. The apparatus of claim 8 wherein the first cylindrical part has two tabs and the second cylindrical part has two openings.

10. The apparatus of claim 1 wherein the sound emitted from the output portion of the bell emulates a wild turkey.

11. The apparatus of claim 7 wherein the elastomeric material of the barrel and bell enable a pressure to be applied by a hand of the user to the barrel or the bell or both the barrel and bell thereby changing a cross-sectional area thereof which varies the sound emitted from the output portion of the bell.

* * * * *